Patented Oct. 28, 1952

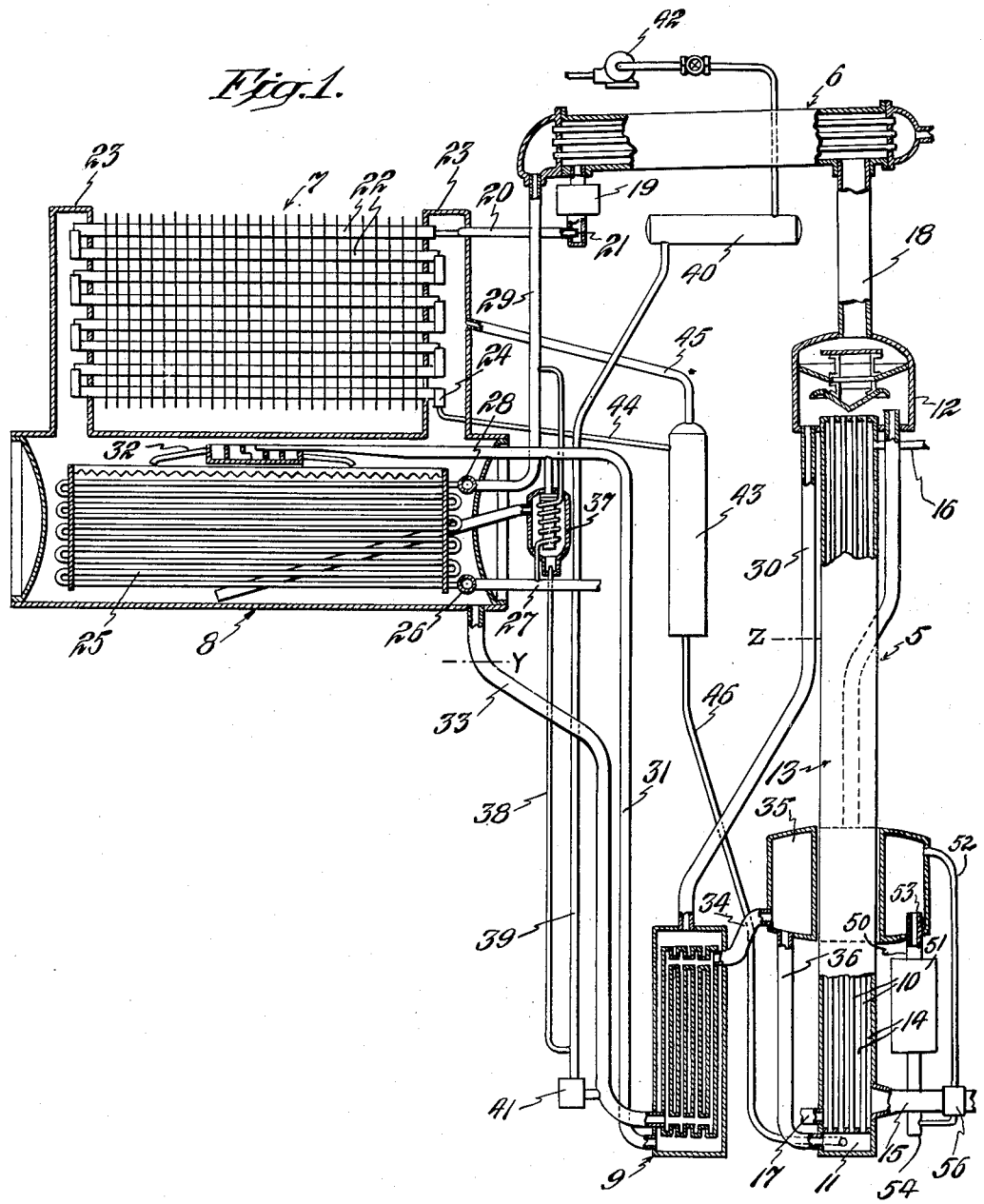

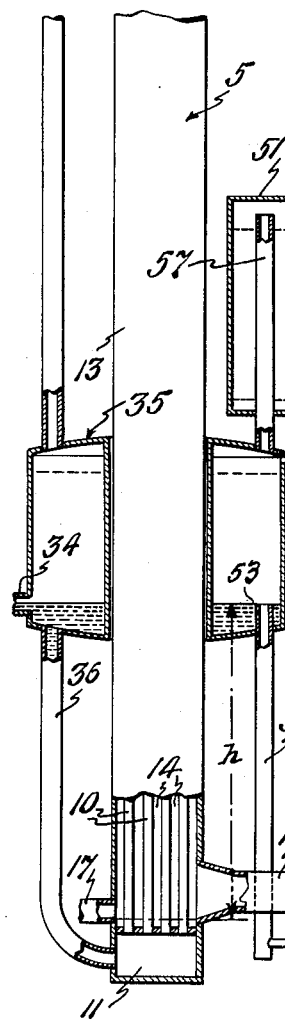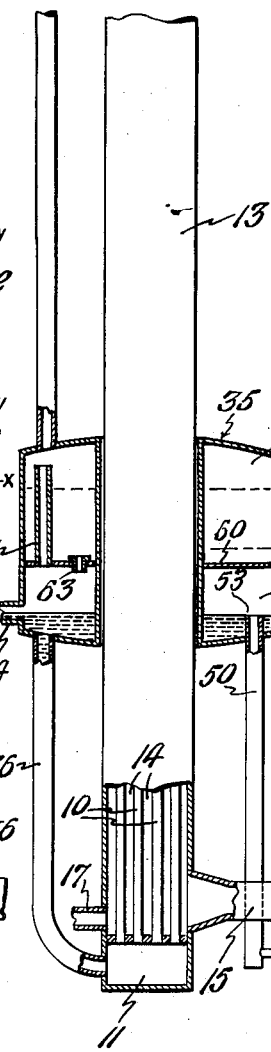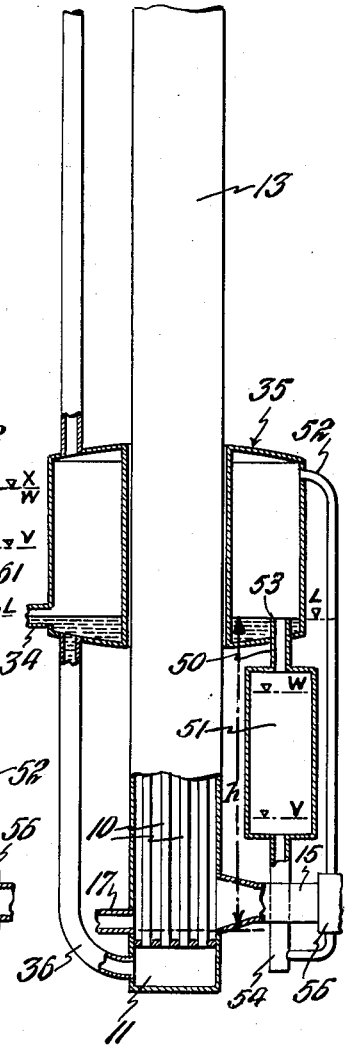

2,615,311

UNITED STATES PATENT OFFICE 2,615,311

APPARATUS FOR MAINTAINING LIQUID LEVEL IN ABSORPTION REFRIGERATION SYSTEMS

Lowell McNeely and Eugene P. Whitlow, Evansville, Ind., assignors to Servel, Inc., New York, N. Y., a corporation of Delaware Application May 14, 1948, Serial No. 27,033

9 Claims. (Cl. 62—119)

The present invention relates to absorption refrigeration systems of the type which utilizes a vapor liquid lift and more particularly to apparatus for controlling the liquid circulation in such refrigeration systems.

The present invention may be used to advantage in any absorption refrigeration system which utilizes vapor for lifting liquid for gravity flow through the system and is shown applied to a two-pressure vacuum type system utilizing water as a refrigerant and a salt solution as an absorbent. In all refrigeration systems utilizing a vapor lift the rate of liquid circulation varies directly with the reaction head. A vaccum type system is subject to superheating which produces irregular liquid circulation and noise caused by the surging of liquid and the collapse of refrigerant vapor. It has been found that the undesirable noise and irregular surging can be materially reduced or eliminated and the liquid circulation rate maintained more constant if a hydrostatic reaction head of a predetermined constant height is maintained on the vapor lift. However, the liquid level and height of the hydrostatic reaction head acting on the vapor lift varies with operating conditions unless some provision is made to compensate for changes in such conditions.

A vacuum type absorption refrigeration system is illustrated and described in the United States Letters Patent to Albert R. Thomas et al. No. 2,282,503, issued May 12, 1942, and entitled Refrigeration. The refrigeration system illustrated in the Thomas patent includes a stabilizing or leveling vessel containing a quantity of surplus solution to provide for variations in the amount of refrigerant and solution circulating in the system and maintain the concentration of the solution within permissible limits. The leveling vessel is so dimensioned that the surplus quantity of liquid therein has a lateral dimension so large relative to its vertical dimension that variations in the amount of refrigerant and solution circulating in the system produces very little change in the liquid level in the vessel. Thus, a substantially constant hydrostatic reaction head is maintained on the vapor liquid lift.

The present invention provides a novel construction and arrangement of elements for maintaining a constant hydrostatic reaction head on the vapor liquid lift. It does not require a large lateral dimension. The vertical dimension may even be the greatest, if that is desired. The arrangement comprises a standpipe connected to receive solution flowing from the absorber and deliver solution to the vapor lift, and an auxiliary circuit for maintaining the solution at a predetermined level in said standpipe. The auxiliary circuit includes an overflow conduit which drains solution from the standpipe to prevent the solution from rising above a predetermined level and a storage tank from which solution is delivered to the standpipe to maintain the solution at said predetermined level. The storage tank may be located below the overflow pipe with the auxiliary circuit arranged to lift solution from the tank to the standpipe, or the storage tank may be located above the overflow pipe with the auxiliary circuit arranged to lift overflowing solution into the storage tank. For purposes of illustration the present invention is shown combined with a vessel similar to the leveling vessel illustrated in Thomas patent referred to above so that the storage of surplus solution may be divided between the vessel and storage tank. With an arrangement of this kind both the vessel and storage tank may be made smaller and of such shapes as to occupy a minimum of space while providing stable operation. It will be understood, however, that the vessel can be completely eliminated and a storage tank of suitable shape and size be provided to contain all of the surplus solution.

It is therefore an object of the present invention to provide a construction and arrangement of elements in an absorption refrigeration system for maintaining a constant predetermined hydrostatic reaction head on a vapor liquid lift which raises solution for gravity flow through the system.

The above and other objects will become more apparent from the following description and drawings in which like reference characters denote like parts throughout the several views. It is to be expressly understood, however, that the drawings are for the purpose of illustration only and are not to be construed as a limitation on the scope of the invention, reference being had for this purpose to the appended claims. In the drawings:

Fig. 1 is a diagrammatic view of an absorption refrigeration system incorporating one form of auxiliary liquid circuit for maintaining a constant reaction head on the vapor liquid lift;

Fig. 2 is an enlarged view of the auxiliary liquid circuit illustrated in Fig. 1 and showing the overflow pipe in a vessel at the upper end of the standpipe, the reservoir tank located below the vessel and the auxiliary liquid lift for delivering liquid from the tank to the vessel;

Fig. 3 is a view similar to Fig. 2 showing a modified construction in which the reservoir tank of the auxiliary liquid circuit is positioned above the standpipe vessel; and Fig. 4 is a view similar to Fig. 3 showing a modified construction in which a single vessel is divided to provide an upper storage tank and lower a standpipe vessel.

In the drawings, the present invention is shown applied to an absorption refrigeration system of the type illustrated and described in the Thomas et al. patent referred to above. The refrigeration system comprises a generator 5, a condenser 6, an evaporator 7, an absorber 8 and a heat exchanger 9 interconnected to provide paths of flow for refrigerant and absorbent. The generator 5 also constitutes a vapor liquid lift and comprises a plurality of upright tubes 10 connected at their lower ends to an inlet chamber 11 and at their upper ends to a separating chamber 12. The tubes 10 are enclosed in a jacket 13 to provide a heating chamber 14 therebetween. Steam is supplied to the heating chamber 14 from a suitable source, such as a boiler, through a conduit 15. A vent pipe 16 connects the chamber 14 to the atmosphere at a point remote from the inlet conduit 15 to maintain the steam in the heating chamber at atmospheric pressure. A condensate drain pipe 17 is provided adjacent the lower end of the heating chamber 14. When steam is supplied to the heating chamber 14, its heat is transmitted through the tubes 10 and expels refrigerant vapor, such as water, from absorption solution, such as a water solution of a hygroscopic salt, and the expelled vapor acts to lift the solution in the tubes by a climbing film vapor lift action to the separating chamber 12.

The separating chamber 12 of the generator 5 is connected to the condenser 6 by a conduit 18 and the condenser, in turn, is connected to the evaporator 7 by a conduit including a liquid receiving vessel 19 and a pipe 20 having an orifice 21 at its end. The orifice 21 at the end of the pipe 20 is of such size as to pass all of the liquid refrigerant condensed in the condenser 6 and permit a limited flow of refrigerant vapor to purge non-condensable gases from the condenser as claimed in a copending application for Letters Patent to Norton E. Berry, Serial No. 725,000, filed January 29, 1947, now Patent No. 2,563,575 and entitled Refrigeration.

Evaporator 7 comprises a plurality of substantially horizontal tubes 22 extending between headers 23. Cups 24 in the headers 23 receive refrigerant flowing from the ends of the tubes 22 and direct it into the next lowermost tubes so that the refrigerant flows successively through the tubes from the top to the bottom of the evaporator. The headers 23 open into the top of the absorber 8 to permit refrigerant vapor evaporated in the evaporator to flow to the absorber. Mounted in the absorber 8 are banks of cooling coils 25 to which cooling water is supplied through a header 26 and supply pipe 27 from any suitable source such as a city water main, cooling tower or the like. Cooling water from the bank of cooling coils 25 is delivered through a header 28 and conduit 29 to the inlet of the condenser 6.

Absorption solution weak in refrigerant or, in other words, the concentrated salt solution, flows by gravity from the separating chamber 12 to the top of the absorber 8 in a path of flow including the conduit 30, heat exchanger 9, conduit 31, and liquid distributor 32. The absorption solution is divided by the liquid distributor 32 for flow over the banks of cooling coils 25 in the absorber 8. Absorption solution strong in refrigerant or, in other words, dilute salt solution, flows by gravity from the bottom of the absorber 8 to the inlet chamber 11 of the generator 5 in a path of flow including the conduit 33, heat exchanger 9, conduit 34, annular vessel 35 and conduit 36. The vessel 35 is positioned above the base of the generator 5 to continuously receive absorption solution as it flows from the absorber 8 and deliver the solution to the inlet chamber 11 of the generator 5. The vessel 35 and conduit 36 constitute a standpipe for maintaining a liquid column to provide a hydrostatic reaction head on the vapor liquid lift tubes 10 of the generator 5 and the vessel may have other shapes or may be completely eliminated if desired.

The generator 5 and condenser 6 operate at a pressure corresponding substantially to the vapor pressure of the refrigerant at its condensing temperature and the evaporator 7 and absorber 8 operate at a lower pressure corresponding to the vapor pressure of the absorbent at the temperature in the absorber. The difference in pressures in the condenser 6 and evaporator 7 is maintained by the orifice 21 in the pipe 20 and the difference in pressures in the absorber 8 and generator 5 is maintained by liquid columns in the conduits 31 and 33. The liquid level in the conduit 33 is indicated by the reference character Y while the liquid level in the conduit 30 connected to the conduit 31 through the heat exchanger 9 is indicated by the reference character Z.

A purging device 37 of the type described and claimed in United States Letters Patent to Charles A. Roswell No. 2,384,861 issued September 18, 1945, continuously withdraws non-condensable gases from the absorber 8 and transfers them to an inactive part of the system. Suffice it to state herein that the purging device 37 is in the form of an auxiliary absorber connected to withdraw non-condensable gases from the absorber 8 and deliver it between alternate slugs of absorption solution through a fall tube pump 38 to the lower end of a riser tube 39. The non-condensable gases ascend in the riser tube 39 to a storage vessel 40 and the absorption solution flows through the connection 41 to the return conduit 33. The non-condensable gases may be removed from the storage vessel 40 from time to time by an exhaust pump 42.

A concentration control vessel 43 of the type described and claimed in a copending application of Lowell McNeely, Serial No. 539,620, filed June 10, 1944, now Patent No. 2,465,904 is connected to the lowermost cup 24 of the evaporator 7 by a conduit 44 and to a header of the evaporator 7 by a conduit 45. The bottom of the concentration control vessel 43 is connected to the inlet chamber 11 of the generator 5 by a conduit 46. During operation of the refrigeration system a quantity of liquid refrigerant, water, will be stored out of solution in a liquid column in conduit 46 and concentration vessel 43 and the height of the liquid column and the quantity of liquid stored in the concentration vessel will vary with variations in the difference in pressure.

In accordance with the present invention an arrangement is provided for maintaining the liquid at a constant predetermined level in the standpipe formed by the conduit 36 and vessel 35 to provide a constant hydrostatic reaction head on the solution in the upright vapor lift tubes 10. In Figs. 1 and 2 the arrangement comprises an auxiliary liquid circuit including an overflow pipe 50 for draining all solution in the vessel 35 above a predetermined level, a reservoir tank 51 located below the vessel 35 for receiving solution from the overflow pipe, and an auxiliary vapor liquid lift 52 for raising the liquid from the reservoir tank to the vessel to maintain solution at said level. The overflow pipe 50 projects upwardly through the bottom of the vessel 35 with its end 53 positioned at said predetermined level L which reduces surging and noise to a minimum while maintaining a desired pumping rate as determined experimentally for the particular unit. The overflow pipe 50 is connected to the top of the reservoir tank 51 and a pipe 54 depends from the bottom of the tank with its lower end closed to provide a sump.

The vapor liquid lift 52 in the auxiliary liquid circuit is in the form of an upright tube connected between the lower end of the sump pipe 54 and the side of the standpipe vessel 35 above the level L. The auxiliary vapor liquid lift 52 may be operated by any suitable source of heat and in the illustrated embodiment a lower portion of the tube extends through a heating chamber 56 in the steam supply conduit 15. Absorption liquid will stand at some level in the upright tube 52 of the auxiliary liquid circuit corresponding to the level in the reservoir tank 51 and when heat is applied thereto refrigerant vapor will be expelled which reduces the weight of the column therein and lifts liquid to a height as balanced by the weight of the column of solution in the tank and sump pipe 54. Therefore, the rate at which solution is circulated in the auxiliary circuit from the reservoir tank 51 to the vessel 35 varies with the height of the liquid column in the sump pipe 54 and reservoir tank. Between periods of operation the refrigerant and absorbent in the various elements of the refrigeration system will drain by gravity to the lowest part thereof and enter the reservoir tank 51 through the overflow pipe 50 to maintain the liquid level L in vessel 35 of the standpipe. Tank 51 is of a size to receive and store this maximum quantity of solution which circulates or is in transit during operation of the system and the minimum and maximum levels in the tank are indicated by the reference characters V and W. One form of the invention having now been described in detail, the mode of operation is explained as follows.

Initially or after a period of operation, the absorption liquid will have drained to the bottom of the refrigeration system and will stand at the level L in the vessel 35 and at the level W in the reservoir tank 51. To initiate operation of the refrigeration system steam will be supplied through the conduit 15 to the heating chamber 56 of the auxiliary liquid circuit and chamber 14 of the generator 5. Heat from the steam is transmitted through the upright tube 52 in the auxiliary liquid circuit and tubes 10 of the generator 5 to expel water vapor from the absorption solution which operates to raise the absorption liquid by vapor lift action. With the solution at the level L in the standpipe vessel 35 a hydrostatic reaction head of the predetermined optimum height $h$ will be provided on the solution in the generator tubes 10.

When steam is initially supplied to the heating chamber 14 the circulation rate in the refrigeration system will be relatively slow until the solution in tubes is all heated to boiling temperature. Circulation in the auxiliary liquid circuit, however, will be at a maximum rate due to the hydrostatic reaction head at the level W in the reservoir tank 51. The auxiliary liquid circuit then will deliver solution from the reservoir tank at a maximum rate at the beginning of a period of operation to maintain liquid at the level L in the standpipe vessel 35 until solution returns from the absorber 8. Any small difference in the circulation rates in the refrigeration system and auxiliary circuit at the beginning of a period of operation and until solution starts returning from the absorber 8 will be supplied from the body of liquid in the vessel 35 below the level L. As the system continues to operate the level in the reservoir tank 51 will gradually fall and the rate of circulation in the auxiliary circuit will gradually decrease until a stabilized condition is reached. However, at all times the auxiliary circuit will supply solution to the standpipe vessel 35 and surplus solution will overflow into the reservoir tank 51 to maintain liquid at the level L.

With liquid maintained at the level L in the vessel 35 a constant reaction head of a height $h$ will be maintained on the solution at the bottom of the generator tubes 10. The solution will be lifted at a substantially constant rate and surging and noise will be reduced to a minimum. Upon the occurrence of a change in operating conditions, such as a decrease in the difference in pressure, the amount of liquid circulating or stored in the elements of the refrigeration system may be reduced and the surplus will be delivered to the vessel 35 and overflow into the reservoir tank 51. On the other hand, if the difference in pressure in the system increases, a greater amount of liquid may circulate or be stored in the system but the circulation of liquid from the tank 51 into the standpipe vessel 35 will maintain liquid at the level L. Thus, the arrangement of the present invention will maintain a substantially constant hydrostatic reaction head on the solution in the upright generator tubes 10 under all operating conditions.

In Fig. 3 a modified construction is illustrated in which the reservoir tank 51 is located above the standpipe vessel 35 and the vapor liquid lift 52 of the auxiliary liquid circuit connects the overflow pipe 50 and tank. Tank 51 is supported on a vent pipe 57 extending upwardly from the top of vessel 35 and through the bottom and center of the tank. A drain tube 58 connects the bottom of the tank 51 with the top of the vessel 35 and the tube is of such size as to limit flow to a rate less than the rate of liquid circulation by the vapor lift 52. The overflow pipe 50 depends from the vessel 35 to a point adjacent the bottom of the generator 5 and the lower end of the pipe is closed to provide the sump. The vapor lift tube 52 is connected between the sump adjacent its lower end and the side of the reservoir tank 51 adjacent its top and a portion of the tube extends through a heating chamber 56 in the steam supply conduit 15. By providing a drain tube 58 which limits the rate of flow from the reservoir tank 51 to a value less than the rate of delivery thereto, solution will continuously flow in the auxiliary liquid circuit and any surplus solution over that required to maintain the level L in standpipe vessel 35 will be stored in the tank. The amount stored will vary with the amount circulated by the vapor lift 52 which, in turn, will vary with the amount entering the overflow pipe 50. Thus, the arrangement operates automatically to either deliver or store solution in accordance with requirements at any particular time.

With the arrangement illustrated in Fig. 3 absorption solution initially will stand at the level X in the standpipe vessel 35. When steam is supplied to the conduit 15 the vapor liquid lift 52 in the auxiliary liquid circuit will deliver solution from the vessel 35 to the tank 51 at a maximum rate due to the high reaction head at the level X. Also the solution will be raised at a maximum rate in the tubes 10 of the generator 5 due to the high reaction head and deliver the solution to the absorber at a maximum rate to quickly reduce the pressure and temperature therein. As both the vapor liquid lift 52 of the auxiliary liquid circuit and the vapor liquid lift tubes 10 of the generator 5 circulate the solution at a maximum rate at the beginning of a period of operation, the solution will quickly fall to the level L in the vessel 35 after which the level will be maintained constant throughout a period of operation of the refrigeration system. When the solution is lowered to the level L in the vessel 35 the vapor lift 52 will raise only the surplus amount of solution entering the overflow pipe 50 and thereby reduce the rate of circulation in the auxiliary liquid circuit to a minimum. Any solution above the level L will overflow into the pipe 50 and solution will continually drain from the reservoir tank 51 into the vessel 35 to maintain the solution at the level L.

In Fig. 4 a modified construction is illustrated in which a vessel 35 is provided with a septum 60 for dividing it into a lower standpipe chamber 61 and an upper reservoir or storage chamber 62. The same type of overflow pipe 50 is provided as illustrated in Fig. 3 with its upper end projecting into the lower standpipe chamber 61 to the level L. The auxiliary vapor lift 52 connects the lower end of the overflow pipe 50 and the side of the reservoir chamber 62 and extends through a heating chamber 56 in the steam supply conduit 15. An orifice 63 is provided in the septum 60 to permit solution to flow from the upper reservoir chamber 62 into the lower standpipe chamber 61 but the orifice 63 is so dimensioned as to deliver solution at a slower rate than it is received so as to store solution while maintaining the predetermined level L in the chamber 61. An overflow vent pipe 64 is also connected to the septum 60 for limiting the amount of solution that can be stored in the upper chamber 62.

The arrangement illustrated in Fig. 4 operates in substantially the same way as the embodiment illustrated in Fig. 3. When steam is supplied through the conduit 15 to the heating chamber 14 of the generator 5 the vapor liquid lift tube 52 in the auxiliary liquid circuit is heated to raise solution from the overflow pipe 50 into the upper storage chamber 62. The generator 5 and vapor lift 52 will circulate solution at a maximum rate until the solution in the standpipe chamber 61 is lowered to a level L at the top of the overflow pipe 50. Solution in the upper storage chamber 62 continually flows through the orifice 63 into the lower chamber 61 to maintain the liquid at the level L. Thus, after an initial period of operation the arrangement illustrated in Fig. 4 will maintain a constant hydrostatic reaction head on the solution in the tubes 10 of the generator 5 and combines the storage tank and standpipe vessel in an integral structure.

While several embodiments of the invention have been illustrated and described, it will be understood that further modifications may be made in the construction and arrangement of the parts without departing from the spirit or scope of the invention. Therefore, without limiting the invention in this respect, the invention is defined by the following claims.

We claim:

1. In an absorption refrigeration system, a plurality of elements interconnected for the circulation of refrigerant and absorbent, an absorption solution circuit having a vapor liquid lift for raising liquid for gravity flow through the circuit, a standpipe in the circuit for receiving liquid as it flows by gravity toward the lift, said standpipe providing a hydrostatic reaction head on the vapor liquid lift, and an auxiliary liquid circuit connected to said standpipe for maintaining the liquid at a predetermined level therein and the hydrostatic reaction head on the liquid lift at a constant height.

2. In an absorption refrigeration system, a plurality of elements including a generator interconnected for the circulation of refrigerant and absorbent, said generator having at least one upright tube constituting a vapor liquid lift for raising absorbent for gravity flow through the system, a standpipe in the system for receiving absorbent and delivering it to the generator and maintaining a hydrostatic reaction head on the generator, and an auxiliary liquid circuit connected to the standpipe for maintaining the absorbent at a predetermined level therein whereby to provide a hydrostatic reaction head of a constant height on the generator.

3. In an absorption refrigeration system, a plurality of elements including a vapor liquid lift interconnected for the circulation of refrigerant and absorbent, a standpipe in the system for receiving liquid and delivering it to the vapor liquid lift and maintaining a hydrostatic reaction head thereon, and an auxiliary liquid circuit having an overflow pipe in said standpipe for draining liquid above a predetermined level and an auxiliary vapor liquid lift arranged in parallel flow with the first mentioned lift for returning drained liquid to the standpipe to maintain liquid at said predetermined level.

4. In an absorption refrigeration system, a plurality of elements including a vapor liquid lift interconnected to provide refrigerant and solution circuits for the circulation of refrigerant and absorbent, said vapor liquid lift raising liquid for gravity flow through the solution circuit, a standpipe in the solution circuit for receiving liquid flowing by gravity to the vapor liquid lift and maintaining a hydrostatic reaction head thereon, and an auxiliary liquid circuit connected to the standpipe for maintaining the liquid at a predetermined constant level therein, said auxiliary liquid circuit comprising an overflow pipe in the standpipe to drain liquid above a predetermined level, a reservoir tank for receiving liquid overflowing from the standpipe, and an auxiliary vapor liquid lift for recirculating liquid from the reservoir tank to the standpipe to maintain the liquid at said level in the latter.

5. In an absorption refrigeration system of the type which operates at a partial vacuum and utilizes water as a refrigerant and a salt solution as an absorbent, a plurality of elements including a generator interconnected for the circulation of refrigerant and absorbent, said generator having a plurality of upright tubes constituting a vapor liquid lift for raising liquid absorbent for gravity flow through the system, a standpipe in the system having a vessel above the base of the generator for receiving absorbent, said standpipe delivering absorbent to the generator and maintaining a hydrostatic reaction head on the generator tubes, and an auxiliary liquid circuit connected to circulate liquid in the standpipe and having an overflow pipe in the vessel for draining surplus absorbent therefrom whereby to maintain a reaction head of a predetermined constant height upon the solution in the generator tubes.

6. In an absorption refrigeration system, a plurality of elements including a vapor liquid lift interconnected for the circulation of refrigerant and absorbent, a standpipe in the system for receiving absorbent flowing thereto by gravity, said standpipe being connected to deliver absorbent to the vapor liquid lift and maintain a hydrostatic reaction head thereon, an overflow pipe at a predetermined level in said standpipe, a reservoir tank connected to the overflow pipe to receive absorbent overflowing from the standpipe, and an auxiliary vapor liquid lift connected to circulate absorbent from the reservoir tank to the standpipe.

7. In an absorption refrigeration system, a plurality of elements including a vapor liquid lift interconnected for the circulation of refrigerant and absorbent, a standpipe in said system having a vessel at its upper end for receiving liquid absorbent flowing thereto by gravity, said standpipe being connected to deliver absorbent to the vapor liquid lift and maintain a hydrostatic reaction head thereon, and an auxiliary liquid circuit comprising an overflow pipe at a predetermined level in said vessel, a reservoir tank connected to the overflow pipe, and an auxiliary vapor liquid lift connecting the tank to the vessel whereby to hold the absorbent at a predetermined level in the vessel and thereby maintain a reaction head of a predetermined constant height on the vapor liquid lift.

8. In an absorption refrigeration system, a plurity of elements including a vapor liquid lift interconnected for the circulation of refrigerant and absorbent, a standpipe in the system for receiving liquid, said standpipe being connected to deliver liquid to the vapor liquid lift and maintain a hydrostatic reaction head thereon, an overflow pipe at a predeterminated level in said standpipe, a tank located above the standpipe, an auxiliary vapor liquid lift connecting the overflow pipe and tank, and a connection between the tank and standpipe providing a restriction for limiting the flow of liquid therebetween to a predetermined rate.

9. In an absorption refrigeration system, a plurality of elements including a vapor liquid lift interconnected for the circulation of refrigerant and absorbent, a vessel in the system having a septum dividing it into upper and lower compartments and an orifice in the septum, said orifice restricting flow to a predetermined rate, the lower compartment of said vessel being connected to receive absorbent and deliver it to the vapor liquid lift and maintain a hydrostatic reaction head thereon, an overflow pipe at a predetermined level in the lower compartment of the vessel, and an auxiliary vapor liquid lift connecting the overflow pipe and upper compartment of the vessel whereby liquid above a predetermined level drains through the overflow pipe and is raised to the upper compartment for flow at a limited rate through the orifice to the lower compartment to maintain the liquid at said predetermined level.

LOWELL McNEELY.
EUGENE P. WHITLOW.

REFERENCES CITED

The following references are of record in the file of this patent:

UNITED STATES PATENTS

| Number | Name | Date |
| --- | --- | --- |
| 1,798,946 | Maiuri | Mar. 31, 1931 |
| 2,263,067 | Burggrabe | Nov. 18, 1941 |
| 2,282,504 | Thomas | May 12, 1942 |
| 2,311,711 | Thomas | Feb. 23, 1943 |
| 2,401,300 | Gross | June 4, 1946 |